United States Patent
Tamatam et al.

(10) Patent No.: US 10,257,487 B1
(45) Date of Patent: Apr. 9, 2019

(54) POWER EFFICIENT VIDEO PLAYBACK BASED ON DISPLAY HARDWARE FEEDBACK

(71) Applicant: QUALCOMM Incorporated, San Diego, CA (US)

(72) Inventors: Raviteja Tamatam, Hyderabad (IN); Prashant Nukala, Hyderabad (IN); Kalyan Thota, Hyderabad (IN); Jayant Shekhar, Hyderabad (IN); Krishna Chaitanya Devarakonda, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/872,702

(22) Filed: Jan. 16, 2018

(51) Int. Cl.
*H04N 9/87* (2006.01)
*G06K 9/46* (2006.01)
*G09G 5/02* (2006.01)
*H04N 5/272* (2006.01)

(52) U.S. Cl.
CPC ......... *H04N 9/8715* (2013.01); *G06K 9/4642* (2013.01); *G06K 9/4652* (2013.01); *G09G 5/026* (2013.01); *H04N 5/272* (2013.01); *G09G 2320/0666* (2013.01); *G09G 2340/125* (2013.01)

(58) Field of Classification Search
USPC .......................................... 386/232, 239–248
See application file for complete search history.

(56) References Cited

U.S. PATENT DOCUMENTS

| | | | | |
|---|---|---|---|---|
| 7,079,192 B1* | 7/2006 | Wysocki | ............... | H04N 5/46 348/556 |
| 2005/0231458 A1* | 10/2005 | Miki | .................. | G09G 3/3406 345/102 |
| 2006/0139492 A1* | 6/2006 | Ahn | ...................... | G09G 5/005 348/558 |
| 2006/0146190 A1* | 7/2006 | Ahn | ...................... | G06T 3/0012 348/458 |
| 2007/0286452 A1* | 12/2007 | Tokunaga | ............ | H04N 7/0122 382/100 |

(Continued)

OTHER PUBLICATIONS

Zhang S-H., et al., "Online Video Stream Abstraction and Stylization", IEEE Transactions on Multimedia, vol. 13, No. 6, Dec. 2011, pp. 1286-1294.

*Primary Examiner* — Hung Q Dang
(74) *Attorney, Agent, or Firm* — Shumaker & Sieffert, P.A.

(57) ABSTRACT

Techniques are described for reducing the number of fetches performed when a background layer (e.g., letter or pillar box) to be displayed is of a constant fill color. One or more processors (e.g., a display processor) may be configured to detect that a background layer is of a constant fill color. If so, rather than fetching the background layer from memory, the one or more processors may be configured to generate the constant fill color for the background layer. In doing so, there may be a reduction in the number of memory fetches performed, as the constant fill background layer is not fetched or is only partially fetched. This may reduce memory fetch operations (as only the video layer is fetched) and therefore power savings (e.g., battery usage) at memory and bus interfaces, decreased use of the bandwidth at the bus and memory, and decreased processor usage.

30 Claims, 8 Drawing Sheets

(56) References Cited

U.S. PATENT DOCUMENTS

| | | |
|---|---|---|
| 2011/0211124 A1* | 9/2011 | Petrides ................. H04N 7/014 |
| | | 348/607 |
| 2011/0285819 A1* | 11/2011 | Nakamura ........... H04N 13/139 |
| | | 348/43 |
| 2012/0026171 A1 | 2/2012 | Danskin et al. |
| 2013/0148947 A1 | 6/2013 | Glen et al. |
| 2015/0379971 A1 | 12/2015 | Staudenmaier et al. |
| 2017/0083999 A1 | 3/2017 | Saurabh et al. |

* cited by examiner

150 →

| type | handle | hint | flag | tr | bind | format | source crop (l,t,r,b) | frame name |

Letter box (Landscape) ⌐152
- HWC | 7f8dc33d10 | 0002 | 0000 | 07 | 0100 | ? 7fa30c06 | 0.0, 0.0, 1120.0, 480.0 | 171, 0, 1268, 2560 | SurfaceView - org.codeaurora.gallery/com.android.gallery3d.app.MovieActivity
- HWC | 7f8dc33d80 | 0002 | 0000 | 00 | 0105 | RGBA_8888 | 0.0, 0.0, 1440.0, 2560.0 | 0, 0, 1440, 2560 | org.codeaurora.gallery/com.android.gallery3d.app.MovieActivity

Pillar box (Landscape) ⌐154
- HWC | 7f8d62e0e0 | 0002 | 0000 | 07 | 0100 | ? 7fa30c06 | 0.0, 0.0, 320.0, 240.0 | 320, 1440, 2240 | SurfaceView - org.codeaurora.gallery/com.android.gallery3d.app.MovieActivity
- HWC | 7f8d62e620 | 0002 | 0000 | 00 | 0105 | RGBA_8888 | 0.0, 0.0, 1440.0, 2560.0 | 0, 0, 1440, 2560 | org.codeaurora.gallery/com.android.gallery3d.app.MovieActivity

Letter box (Portrait) ⌐156
- HWC | 7f8dc33140 | 0002 | 0000 | 00 | 0100 | ? 7fa30c06 | 0.0, 0.0, 1120.0, 480.0 | 971, 1440, 1588 | SurfaceView - org.codeaurora.gallery/com.android.gallery3d.app.MovieActivity
- HWC | 7f8dc62e770 | 0002 | 0000 | 00 | 0105 | RGBA_8888 | 0.0, 0.0, 1440.0, 2560.0 | 0, 0, 1440, 2560 | org.codeaurora.gallery/com.android.gallery3d.app.MovieActivity

FIG. 5

POWER EFFICIENT VIDEO PLAYBACK BASED ON DISPLAY HARDWARE FEEDBACK

TECHNICAL FIELD

The disclosure relates to display processing.

BACKGROUND

During video playback, where the aspect ratio of a display (or window) is different than the aspect ratio of the video, a video player application may stretch video to fit the display/window distorting the image, crop video to fit the display/window, or apply mattes to create letter or pillar boxing on the video for display. To create the letter or pillar boxing effect, video players may overlay video on top of a black layer, or other constant color background, that acts as a base.

SUMMARY

In general, this disclosure describes techniques for reducing the number of fetches performed when a background layer (e.g., letter or pillar box) to be displayed is of a constant fill color. One or more processors (e.g., a display processor) may be configured to detect that a background layer is of a constant fill color. If so, rather than fetching the background layer from memory, the one or more processors may be configured to generate the constant fill color for the background layer. In doing so, there may be a significant reduction in the number of memory fetches performed, as only the video layer is fetched rather than both the video layer and the constant fill background layer. Reducing the number of memory fetches may also result in considerable power savings at the memory, and less traffic on memory bus interfaces. This may improve battery life by reducing the number of memory fetch operations performed.

In one example, the disclosure describes a method for displaying video data, the method including detecting that a background layer including first pixel data of a constant color is being provided from a memory for display, wherein the background layer is of an application associated with multiple layers, generating second pixel data of the constant color for the background layer of the application without fetching all of the first pixel data of the constant color for the background layer from the memory in response to the detecting that the background layer includes pixel data of the constant color; retrieving a foreground layer of the application associated with the multiple layers from the memory, and compositing the retrieved foreground layer and the generated second pixel data of the constant color for the background layer for display.

In one example, the disclosure describes a device for displaying video data, the device having at least one internal memory, and one or more processors in communication with the at least one internal memory, the one or more processors configured to: detect that a background layer including first pixel data of a constant color is being provided from a memory for display, wherein the background layer is of an application associated with multiple layers, generate second pixel data of the constant color for the background layer of the application without fetching all of the first pixel data of the constant color for the background layer from the at least one internal memory in response to the detecting that the background layer includes pixel data of the constant color, retrieve a foreground layer of the application associated with the multiple layers from the at least one internal memory, and composite the retrieved foreground layer and the generated second pixel data of the constant color for the background layer for display.

In one example, the disclosure describes a device for displaying video data, the device having means for detecting that a background layer including first pixel data of a constant color is being provided from a memory for display, wherein the background layer is of an application associated with multiple layers, means for generating second pixel data of the constant color for the background layer of the application without fetching all of the first pixel data of the constant color for the background layer from the memory in response to the detecting that the background layer includes pixel data of the constant color, means for retrieving a foreground layer of the application associated with the multiple layers from the memory, and means for compositing the retrieved foreground layer and the generated second pixel data of the constant color for the background layer for display.

In one example, the disclosure describes a computer-readable storage medium storing instructions that when executed cause one or more processor to: detect that a background layer including first pixel data of a constant color is being provided from a memory for display, wherein the background layer is of an application associated with multiple layers, generate second pixel data of the constant color for the background layer of the application without fetching all of the first pixel data of the constant color for the background layer from the memory in response to the detecting that the background layer includes pixel data of the constant color, retrieve a foreground layer of the application associated with the multiple layers from the memory, and composite the retrieved foreground layer and the generated second pixel data of the constant color for the background layer for display.

The details of one or more examples are set forth in the accompanying drawings and the description below. Other features, objects, and advantages will be apparent from the description, drawings, and claims.

BRIEF DESCRIPTION OF DRAWINGS

FIG. 5 is a table illustrating layer details in an exemplary implementation of the present techniques.

DETAILED DESCRIPTION

This disclosure describes example techniques for display processing that may reduce the number of fetches of a constant fill color from memory and replace the pixel data that would have been fetched from memory with a constant fill (e.g., pixels of a constant color are generated rather than fetched from memory). During video playback on a multimedia device (e.g., a smartphone), a video player application may cause a processor (e.g., a display processor) to overlay (or composite) video (a foreground layer) on top of a single/constant color (e.g. black) layer which acts as a base (a background layer). The background layer may cover the full display (e.g., with the same pixel height and width as the display) and may be overlaid with the foreground (video) layer. A layer may include an individual window or a buffer that stores visual data for display and may be independently updated from other layers. Layers may be blended or composited to produce a final frame for display. In certain examples, the purpose of background layer is to show the video content in either a letter box or pillar box format. In the examples, a display overlay engine may fetch the full background layer from memory. This is a costly memory operation, considering that the pixels of a single color are repeated in the layer. To reduce costly memory fetch operations, examples of the present techniques reduce the fetching of the constant fill color from memory, and replace the fetched layer with a constant fill. In replacing the fetched layer with a constant fill, there may be a reduction in memory fetch operations (as only the video layer is fetched) and therefore power savings (e.g., battery usage) at memory and bus interfaces, decreased use of the bandwidth at the bus and memory, and decreased processor usage.

As used herein, constant color or constant fill color may include a layer including pixel information only of a single color or pixel information that may include small variations in color (e.g., pixels of a different color that may be imperceptible to a human viewer). In some examples, the foreground layer may include video, a still frame from a video, a picture, animation, text, or any other content (static or in motion) that may be placed over a constant color layer.

Figure 1:
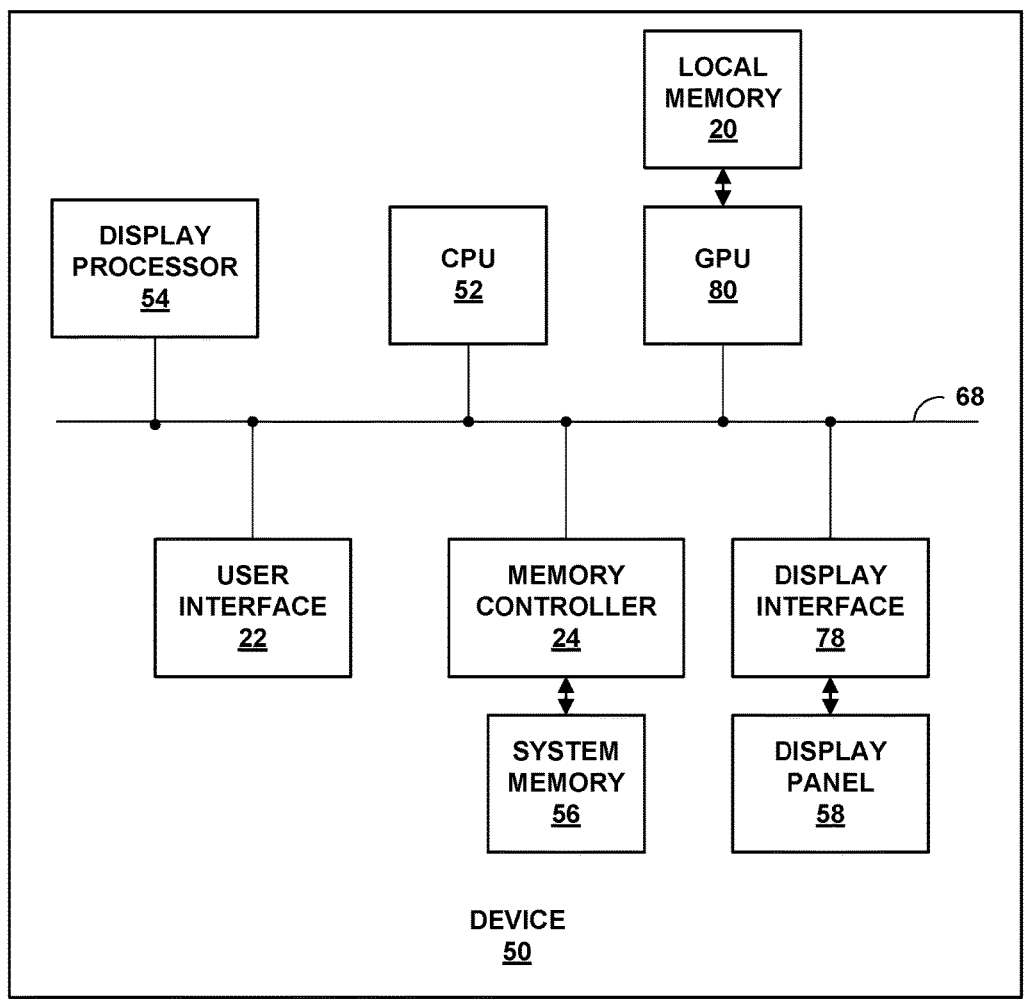
FIG. 1 is a block diagram illustrating an example computing device that may be configured to implement one or more examples of this disclosure.

FIG. 1 is a block diagram of a device configured to perform one or more of the example techniques described in this disclosure. Device 50 may be a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone for teleconferencing, an Internet telephone, a handheld device such as a portable video game device or a personal digital assistant (PDA), or an embedded device (in, e.g., an automobile or a kitchen appliance). Rather, FIG. 1 illustrates the components for performing example techniques described in this disclosure.

Additional examples of device 50 include a personal music player, a video player, a display device, a camera, a television, a set-top box, a broadcast receiver device, a server, an intermediate network device, a mainframe computer or any other type of device that processes and/or displays graphical data. For purposes of description, the examples are described with respect to device 50 being a wireless communication device with the understanding that the examples may be extended to other examples of device 50.

As illustrated in the example of FIG. 1, device 50 includes central processing unit (CPU) 52, a graphical processing unit (GPU) 80 and local memory 20 of GPU 80, user interface 22, memory controller 24 that provides access to system memory 56, display processor 54, and display interface 78 that outputs signals that cause graphical data to be displayed on one or more displays 58. Bus 68 provides the interconnection of the various components.

Although the various components are illustrated as separate components, in some examples the components may be combined to form a system on chip (SoC). As an example, CPU 52, GPU 80, display processor 54, and display interface 78 may be formed on a common integrated circuit (IC) chip. In some examples, one or more of CPU 52, GPU 80, display processor 54, and display interface 78 may be in separate IC chips. Various other permutations and combinations are possible, and the techniques should not be considered limited to the example illustrated in FIG. 1. In some embodiments, device 50 may not include a display processor 54 as a separate component, and any processing, as described herein as performed by a display processor, may be performed by, for example, CPU 52 or GPU 80.

The various components illustrated in FIG. 1 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as, e.g., random access memory (RAM), static RAM (SRAM), dynamic RAM (DRAM), Double Data Rate (DDR) RAM, erasable programmable ROM (EPROM), electrically erasable programmable ROM (EEPROM), flash memory, a magnetic data media or an optical storage media.

The various units illustrated in FIG. 1 communicate with each other using bus 68. Bus 68 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

One or more display panels 58 display information to the user. The terms display, display panel, or panel maybe used interchangeably. Examples of one or more displays 58 include a monitor, a liquid crystal display (LCD), a plasma display panel, a light emitting diode (LED) array, a touch panel, and the like.

In some examples, there may be only one display panel 58 in device 50, such as one large screen that also functions as user interface 22. In some examples, there may be a plurality of displays 58. Display panel 58 may be in a static orientation. In another embodiment, display panel 58 can be a device where the orientation can be changed and the mode (portrait or landscape) may be automatically updated.

There may be one GPU, like GPU 80, and one display interface, like display interface 78, associated with each one of displays 58, or there may be a single GPU 80 and single display interface 78 for each one of displays 58. In the examples described in this disclosure, there is one GPU 80 and one display interface 78 for each one of displays 58. However, the example techniques are applicable also to where there are multiple ones of GPU 80 and multiple ones of display interface 78.

Display processor 54 (also known as a display engine) may include one or more hardware units that retrieves images stored in system memory 56, performs one or more image processing operations on the retrieved images, and outputs the processed images to display(s) 58. In other words, display processor 54 retrieves an image from system memory 56 and may output values that cause the pixels of display(s) 58 to illuminate to display the image. In some examples, display processor 54 may be configured to perform image processing operations on the image retrieved from system memory 56 to be displayed by display(s) 58. Such image processing operations may include format converting, scaling, rotation, blending, compositing, layering of the image with additional graphics, and the like. In general, display processor 54 may perform some operations that are generally not expected to change the content of images in some use cases (e.g., compositing operations), and may perform other operations that are generally expected to change the content of image in such use cases (e.g., by adjusting hue, saturation, brightness, etc.).

The configuration of display processor 54 in FIG. 1 is exemplary. In other examples, display processor 54 may be configured to receive visual content from any source, such as CPU 52, GPU 80, or any digital signal process (DSP), camera processor, video processing unit, image processing unit, pixel processing unit, memory storing visual content, or any other source.

As used herein, the term "visual content" includes but is not limited to any graphics data, graphical data, video data, image data, pixel data, graphics content, graphical content, video content, image content, pixel content, and/or any other type of content that may be displayed.

User interface 22 is used in this disclosure to generically refer to ways in which a user may interact with device 50. In some examples, user interface 22 may be part of one or more displays 58, such as in examples where one of displays 58 is a touch panel.

CPU 52 may be a general-purpose or a special-purpose processor that controls operation of device 50. A user may provide input to device 50 to cause CPU 52 to execute one or more software applications. The software applications that execute on CPU 52 may include, for example, a graphical user interface application or another program. As an example, CPU 52 may execute one or more software applications that generate image content for icons shown on one or more displays 58.

The above example applications that CPU 52 executes are examples where CPU 52 generates image content for display. However, there may be other example applications that CPU 52 executes that do not generate image content such as the operating system. Furthermore, rather than executing applications to generate the image content, CPU 52 may be hardwired to generate the image content.

There may be various combinations and permutations of using fixed-function and programmable circuitry for CPU 52 to generate information that is to be displayed on one or more displays 58. The above provide some examples, and such examples should not be considered limiting.

The software applications that execute on CPU 52 may include one or more graphics rendering instructions that instruct GPU 80 to cause the rendering of graphics data for storage in system memory 56 and/or for display on display panel 58. In some examples, the software instructions may conform to a graphics application programming interface (API), such as, e.g., an Open Graphics Library (OpenGL®) API, an Open Graphics Library Embedded Systems (OpenGL® ES) API, an OpenCL™ API, a Direct3D® API, an X3D® API, a RenderMan® API, a WebGL™ API, or any other public or proprietary standard graphics API. The techniques should not be considered limited to requiring a particular API.

Memory controller 24 facilitates the transfer of data going into and out of system memory 56. For example, memory controller 24 may receive memory read and write commands, and service such commands with respect to system memory 56 in order to provide memory services for the components in device 50. Memory controller 24 is communicatively coupled to system memory 56. Although memory controller 24 is illustrated in the example of device 50 of FIG. 1 as being a processing circuit that is separate from both CPU 52 and system memory 56, in other examples, some or all of the functionality of memory controller 24 may be implemented on one or both of CPU 52 and system memory 56.

System memory 56 may store program modules, instructions and/or data that are accessible by display processor 54, CPU 52, and/or GPU 80. For example, system memory 56 may store user applications (e.g., instructions for a video player application), resulting images from a camera and/or GPU 80, and the like. System memory 56 may additionally store information for use by and/or generated by other components of device 50. System memory 56 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some examples, system memory 56 may include instructions that cause display processor 54, CPU 52, GPU 80, and display interface 78 to perform the functions ascribed to these components in this disclosure. Accordingly, system memory 56 may be a computer-readable storage medium having instructions stored thereon that, when executed, cause one or more processors (e.g., display processor 54, CPU 52, GPU 80, and display interface 78) to perform various functions.

In some examples, system memory 56 is a non-transitory storage medium. The term "non-transitory" indicates that the storage medium is not embodied in a carrier wave or a propagated signal. However, the term "non-transitory" should not be interpreted to mean that system memory 56 is non-movable or that its contents are static. As one example, system memory 56 may be removed from device 50, and moved to another device. As another example, memory, substantially similar to system memory 56, may be inserted into device 50. In certain examples, a non-transitory storage medium may store data that can, over time, change (e.g., in RAM).

Display processor 54, CPU 52, and GPU 80 may store image data, and the like in respective buffers that are allocated within system memory 56. Display interface 78 may retrieve the data from system memory 56 and configure display panel 58 to display the image represented by the generated image data. In some examples, display interface 78 may include a digital-to-analog converter (DAC) that is configured to convert the digital values retrieved from system memory 56 into an analog signal consumable by display panel 58. In other examples, display interface 78 may pass the digital values directly to display panel 58 for processing.

Figure 6:
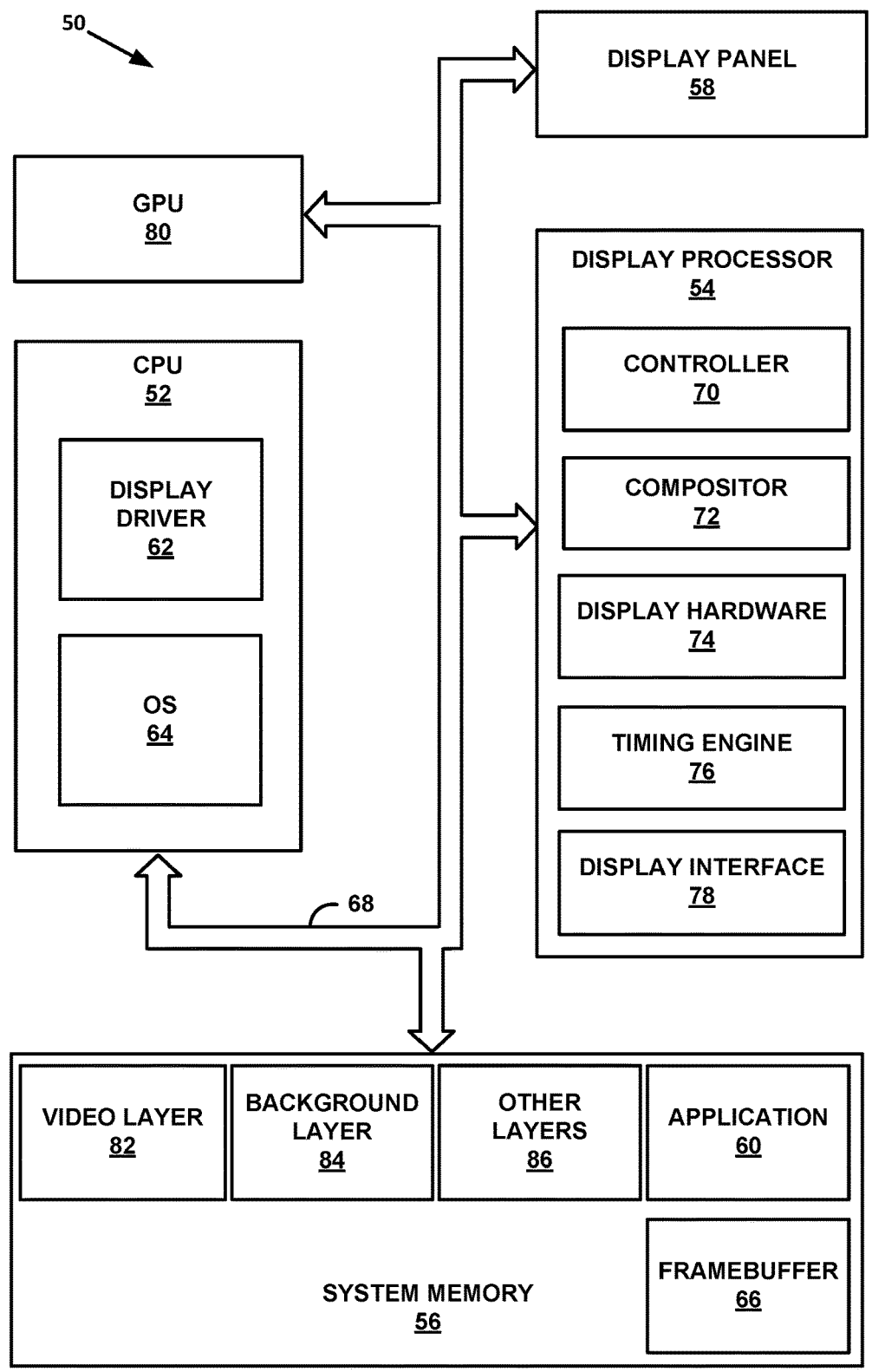
FIG. 6 is a block diagram illustrating the device of FIG. 1 in further detail in accordance with one or more example techniques described in this disclosure.

This disclosure describes example techniques for display processor 54 to detect whether a layer of constant color information is being fed from application to display processor 54. Display processor 54 may read in at least one frame of background layer 84 (as shown in FIG. 6) from system memory 56. Display processor 54 may determine whether the frame of background layer 84 is a constant color. If background layer 84 is a constant color, display processor 54 may stop fetching background layer 84 from system memory 56. Instead, display processor 54 may generate a background layer (without fetching from system memory 56) for display on display panel 58. Controller 70 may monitor a data integrity check value to determine whether a layer was changed, by e.g., comparing an integrity check value of the present frame of the generated background layer with an integrity check value of a frame of background layer 84 stored in system memory 56.

Figure 2:
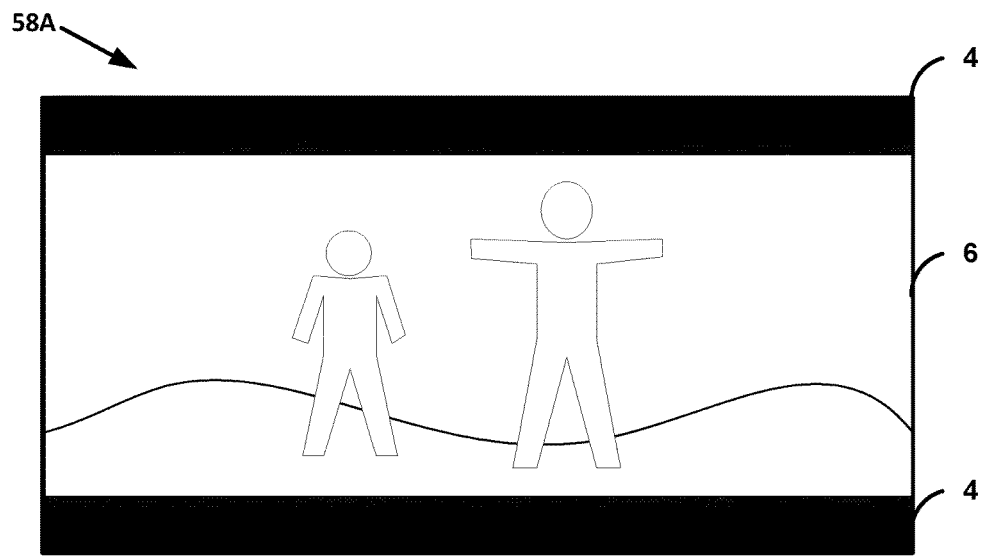
FIGS. 2-4 illustrate three exemplary displays which are displaying a video.
Figure 3:
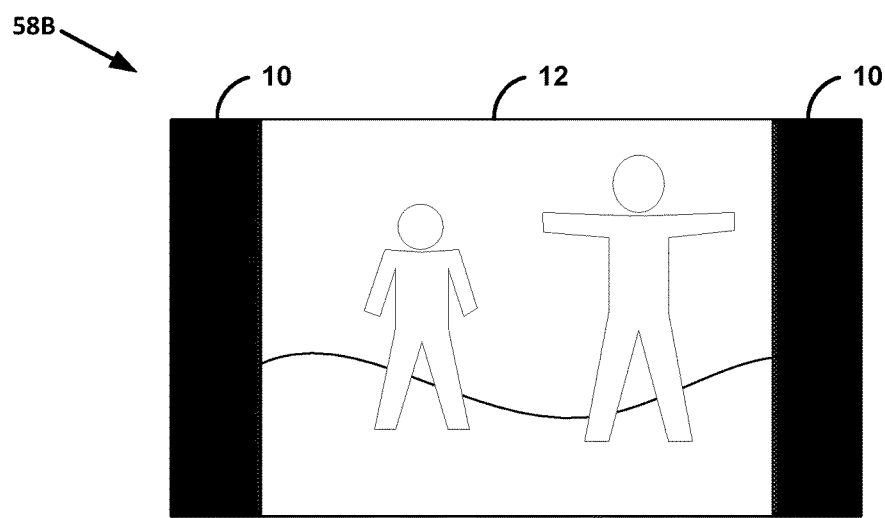
Figure 4:
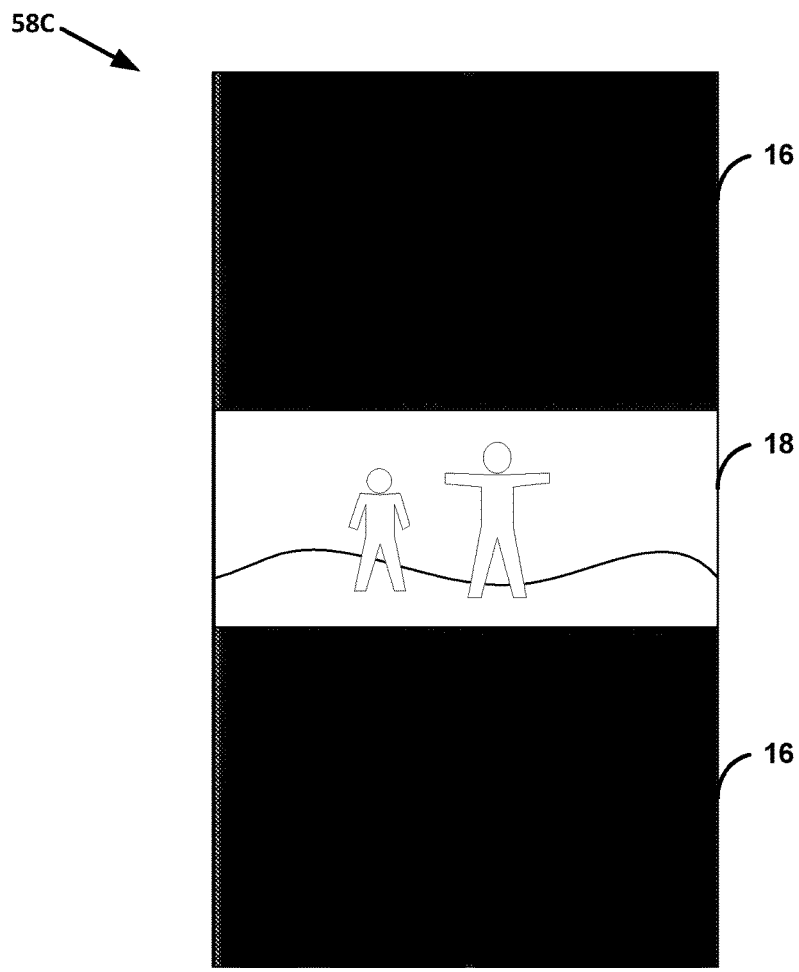

FIGS. 2-4 illustrate exemplary frames of videos displaying on display panels 58A-C. FIGS. 2 and 3 illustrate display panels 58A and 58B displaying in landscape mode and FIG. 4 illustrates display panel 58C displaying in portrait mode. In some examples, applications, including those that perform video playback, may render the background layer to show letter boxing or pillar boxing whenever the aspect ratio of the video frame is different than display panel aspect ratio (as illustrated in FIGS. 2-4).

FIGS. 2-4 illustrate display panels 58A-C. A video application executing on a display panel can include multiple layers including one or more background layers 4, 10, and 16 and foreground video layers 6, 12, and 18. FIGS. 2 and 3 illustrate display panels 58A and 58B in a landscape orientation displaying video with two different aspect ratios. In an embodiment, displays 58A and 58B are the same display displaying video in different aspect ratios. FIG. 2 illustrates an image or a frame from video content with a widescreen aspect ratio (relative to the aspect ratio of display panel 58). In some embodiments, widescreen may refer to an aspect ratio with a width-to-height aspect ratio greater than 1.37:1 or 4:3, while, in other embodiments, widescreen may refer to a relative aspect ratio of video content that has a greater width-to-height aspect ratio compared to that of display panel 58. Full screen may refer to video content with a 4:3 aspect ratio, full screen may refer to video content with an aspect ratio with a width-to-height aspect ratio of less than 1.37:1, or full screen may refer to video content with an aspect ratio with a smaller width-to-height aspect ratio compared to that of display panel 58. In the configuration illustrated in FIG. 2, a video application may use letter boxes to retain the original aspect ratio of the video when the aspect ratio is different from the aspect ratio of display panel 58A. FIG. 2 illustrates video layer 6 bounded above and below by letter boxes created by background layer 4. In one example, the top and bottom bars (i.e., letter boxes) are part of a single layer (background layer 4) with a 1440×2560 pixel size video (video layer 6) on a 1600×2560 pixel panel which may also be the dimensions of background layer 4. Video content may be scaled (up or down) when forming a layer which may then be overlaid on background layer 4 on display panel 58A.

FIG. 3 illustrates a full screen aspect ratio (relative to the aspect ratio of display panel 58B). In the configuration illustrated in FIG. 3, a video application may use pillar boxes to retain the original aspect ratio of the video frame when the aspect ratio is different from the aspect ratio of display panel 58B. FIG. 3 illustrates video layer 12 bounded on the right and left side by pillar boxes created by background layer 10.

FIG. 4 illustrates display panel 58C displaying in portrait mode illustrating video layer 18 bounded by letter boxes above and below created by background layer 16 due to the relative widescreen aspect ratio of video layer 18. In some examples, when a display panel 58C is rotated, device 50 may detect an orientation change (via, e.g., an accelerometer) and automatically rotate the frame to be displayed on display panel 58C such that video layer 6, 12, or 18 remains in the correct orientation. After display panel 58C rotates, video that may have been bordered by pillar boxes (e.g., as illustrated in display panel 58B of FIG. 3) may be bordered by letter boxes (e.g., as illustrated in display panel 58C of FIG. 4). In other examples, not illustrated, video may be bounded by a single letter or pillar box, by a combination of a pillar box and a letter box, or surrounded (bordered) by a background layer on three or four sides.

In some examples, the purpose of the background layer is to show the video content in either letter box or pillar box format. That is, the video content is shown in its original aspect ratio without stretching or zooming. Thus, an application may generate a background layer where a letter box or pillar box is used after determining that the aspect ratio of display panels 58A-C is different than the aspect ratio of the video content. The display overlay engine (e.g., display processor 54) is configured to fetch the full background layer. In some examples, such as those shown in FIGS. 2-4, the background layer is of a constant color. That is, every pixel of the background layer is the same color (e.g., all black, all gray, all white, all red). While this may occur with letter box and pillar box video formatting, background layers of a constant fill color may occur in other applications. Fetching constant fill color pixels of a background layer is a costly memory operation, considering that the pixels of a single color are repeated in the layer.

In some examples, to process the video for display, display processor 54 of device 50 may fetch, from system memory 56, both the foreground video layer (e.g., one of foreground video layers 6, 12, or 18) and the background layer (e.g., one of background layers 4, 10, or 16) to send to display hardware in display processor 54 to be composited for display. Even though, as illustrated, background layers 4, 10, and 16 are just an unchanging single-color layer the size of display panel 58, device 50 may be configured to fetch each pixel from memory to create the letter/pillar box effect.

Thus, exemplary systems and methods demonstrate reducing the number of fetches performed when a background layer (e.g., letter or pillar box) to be displayed is of a constant fill color. Display processor 54 may be configured to detect that a background layer is of a constant fill color. If so, rather than fetching the background layer from memory, the one or more processors may be configured to generate the constant fill color for the background layer. In doing so, there may be a reduction in the number of memory fetches performed, as only the video layer is fetched rather than both the video layer and the constant fill background layer. Reducing the number of memory fetches may also result in power savings, due to the reduction in the use of system memory 56 for fetching operations, which may improve battery life on battery-powered devices. This may also result in less traffic on memory bus interfaces.

FIG. 5 is a table illustrating compositor layer data from a display compositor (e.g. SurfaceFlinger display compositor in a Google® Android™ implementation) of the present techniques. Table 150 illustrates data that describes one or more executions of a command which provides layer information during the composition cycle for a display compositor (e.g. a "dumpsys SurfaceFlinger" command) that may output a hardware composer state. The hardware composer state may include a listing of the status of each layer handled by a hardware composer. Hardware composer may be a software abstraction layer on top of display hardware. For example, operating system 64 (of FIG. 6), e.g. a Google® Android™ operating system, may provide functionality to compose layers and may be based on hardware capability. Table 150 has rows that correspond to the displays illustrated in FIG. 2 (Letter box (Landscape) 152), FIG. 3 (Pillar box (Landscape) 154), and FIG. 4 (Letter box (Portrait) 156). Each row corresponds to a layer present on device 50. Table 150 has columns that correspond to: type (what device is handling the layer, e.g., Hardware Composer (HWC) on display processor 54 or GLES (OpenGL (Open Graphics Library) for Embedded Systems on the GPU), handle (a unique layer identifier), hints (information on how to compose the layer), flags (e.g., multiple rectangles in the layer, or whether the layer is secure/non-secure), tr (transformation or rotation information e.g., if a layer is rotated 0° or 90°), blend (additional flags, e.g., plane alpha (transparency)), form at (picture format), source crop (the section of an image that will be displayed, which may include the full resolution of the video or layer), frame (where the section of the source image is going to be situated in the final frame, which may include the full resolution of the video or layer), and name (the source file name/location).

Specifically, each of the bullets listed first under Letter box (Landscape) 152, Pillar box (Landscape) 154, and Letter box (Portrait) 156 shows data corresponding to an exemplary video layer. Each of the bullets listed second illustrates data corresponding to an exemplary background layer.

A technique of the present disclosure is to reduce the number of fetches performed when a background layer (e.g., letter or pillar box) to be displayed is of a constant fill color. One or more processors (e.g., a display processor) may be configured to detect that a background layer is of a constant fill color. If so, rather than fetching the background layer from memory, the one or more processors may be configured to generate the constant fill color for the background layer. In doing so, there may be a reduction in the number of memory fetches performed, as only the video layer is fetched rather than both the video layer and the constant fill background layer). By replacing the fetched layer with a constant fill, there may be a reduction in memory fetch operations (as only the video layer is fetched) and therefore power savings (e.g., battery usage) at memory and bus interfaces, decreased use of the bandwidth at the bus and memory, and decreased processor usage. For example, battery power testing performed confirms that power savings between 4.6-8.2%, depending on the aspect ratio resolution of the display.

FIG. 6 is a block diagram of the device of FIG. 1 in further detail in accordance with one or more example techniques described in this disclosure. FIG. 6 illustrates device 50, examples of which include, but are not limited to, video devices such as media players, set-top boxes, wireless handsets such as mobile telephones (e.g., so-called smartphones), personal digital assistants (PDAs), desktop computers, laptop computers, gaming consoles, video conferencing units, tablet computing devices, and the like.

Shown in FIG. 6 is a central processing unit (CPU) 52, graphics processing unit (GPU) 80, display processor 54, system memory 56, and display panel 58 of device 50. As shown in FIG. 6, CPU 52 is communicatively coupled to each of GPU 80, display processor 54 and system memory 56 and display panel 58, via bus 68. In examples where device 50 is a mobile device, display processor 54 can be a mobile display processor (MDP). Display processor 54 and GPU 80 may be located on the same microchip as CPU 52 forming a system on a chip (SoC), or may be in a separate microchip. Each of the foregoing components may be resident on the same or different integrated circuits in device 50 and may reside in a single or multiple housings.

Examples of CPU 52, GPU 80, and display processor 54 include, but are not limited to, one or more digital signal processors (DSPs), general purpose microprocessors, application specific integrated circuits (ASICs), field programmable gate/logic arrays (FPGAs), or other equivalent integrated or discrete logic circuitry. In some examples, GPU 80 and display processor 54 may be specialized hardware that includes integrated and/or discrete logic circuitry that provides GPU 80 and display processor 54 their processing capabilities. For instance, display processor 54 may be specialized integrated circuit hardware that is designed to retrieve image content from system memory 56, compose the image content into an image frame, and output the image frame to display panel 58.

In general, CPU 52, GPU 80, and display processor 54 are examples of processing circuits configured to perform the example techniques described in this disclosure. The processing circuit includes fixed-function circuitry and/or programmable circuitry. Accordingly, the example techniques may be performed with fixed-function circuitry, programmable circuitry, or a combination of fixed-function and programmable circuitry.

The various units illustrated in FIG. 6 communicate with each other using bus 68. Bus 68 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect (such as a Display Serial Interface (DSI) bus or one or more pipes). It should be noted that the specific configuration of buses and communication interfaces between the different components shown in FIG. 6 is merely exemplary, and other configurations of computing devices and/or other image processing systems with the same or different components may be used to implement the techniques of this disclosure.

Although not illustrated, device 50 may include a user interface and/or a transceiver module. Device 50 may include additional modules or units not shown in FIG. 6 for purposes of clarity. For example, device 50 may include a speaker and a microphone, neither of which are shown in FIG. 6, to effectuate telephonic communications in examples where device 50 is a mobile wireless telephone. Furthermore, the various modules and units shown in device 50 may not be included in every example of device 50. For example, display panel 58 may be external to device 50 in examples where device 50 is a desktop computer. As another example, a user interface may be part of display panel 58 in examples where display panel 58 is a touch-sensitive or presence-sensitive display of a mobile device.

Display panel 58 may be a liquid crystal display (LCD), a light-emitting diode (LED), an organic LED (OLED), a plasma display, a touch-sensitive display, a presence-sensitive display, or another type of display device. A user interface may include, but is not limited to, a trackball, a mouse, a keyboard, and other types of input devices. The user interface may also be a touch screen and may be incorporated as a part of display panel 58. A transceiver module may include circuitry to allow wireless or wired communication between device 50 and another device or a network. The transceiver module may include modulators, demodulators, amplifiers, and other such circuitry for wired or wireless communication.

As illustrated, CPU 52 is configured to execute one or more applications 60 (stored in system memory 56), display driver 62, and operating system (OS) 64. Display processor 54 includes a controller 70, compositor 72, display hardware 74, timing engine 76, and display interface 78.

In some examples, controller 70, compositor 72, display hardware 74, and timing engine 76 may be fixed-function circuits. In some examples, controller 70, compositor 72, display hardware 74, and timing engine 76 represent programmable circuits that are programmable to perform the example techniques. In general, the example techniques of display processor 54 may be performed by fixed-function, programmable, or a combination of fixed-function and programmable circuits.

Application 60, display driver 62, and OS 64 are software applications executing on CPU 52 to perform the example techniques described in this disclosure. However, the techniques are not so limited. In some examples, one or more of application 60, display driver 62, and OS 64 may be formed as fixed-function circuits. Accordingly, the example techniques may be performed by fixed-function circuits, programmable circuits, or a combination of fixed-function and programmable circuits.

System memory 56 may store program modules and/or instructions and/or data that are accessible by CPU 52, GPU 80, and display processor 54. For example, system memory 56 may store user applications (e.g., instructions for a video player like application 60), one or more frame buffer 66 for display (including, e.g., a video frame) from display processor 54 or GPU 80, buffers (e.g., buffer queues) that hold layer data such as video layer 82, background layer 84, and other layers 86, etc. System memory 56 may additionally store information for use by and/or generated by other components of device 50. System memory 56 may include one or more volatile or non-volatile memories or storage devices, such as, for example, random access memory (RAM) such as Double Data Rate (DDR) RAM, static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some examples, system memory 56 may include instructions that cause CPU 52, GPU 80, and display processor 54 to perform the functions ascribed to these components in this disclosure. Accordingly, system memory 56 may be a computer-readable storage medium having instructions stored thereon that, when executed, cause one or more processors (e.g., CPU 52, GPU 80, and display processor 54) to perform various functions.

In some examples, system memory 56 is a non-transitory storage medium. The term "non-transitory" indicates that the storage medium is not embodied in a carrier wave or a propagated signal. However, the term "non-transitory" should not be interpreted to mean that system memory 56 is non-movable or that its contents are static. As one example, system memory 56 may be removed from device 50, and moved to another device. As another example, memory, substantially similar to system memory 56, may be inserted into device 50. In certain examples, a non-transitory storage medium may store data that can, over time, change (e.g., in RAM).

CPU 52 may execute various types of applications. Examples of the applications include web browsers, e-mail applications, spreadsheets, video games, media player applications, or other applications that generate viewable objects for display. System memory 56 may store instructions for execution of the one or more applications. The execution of application 60 on CPU 52 causes CPU 52 to produce graphics data for image content that is to be displayed. CPU 52 may transmit graphics data of the image content to GPU 80 for further processing, the processing based on instructions or commands that CPU 52 transmits to GPU 80. CPU 52 may receive information from various sensors resident on device 50. In one example, a sensor may include an accelerometer that may allow CPU 52 to determine the orientation of device 50.

CPU 52 may communicate with GPU 80 in accordance with a particular application processing interface (API). Examples of such APIs include the DirectX® API by Microsoft®, the OpenGL® API or OpenGL ES® API by the Khronos group, and the OpenCL™ API; however, aspects of this disclosure are not limited to the DirectX, the OpenGL, or the OpenCL APIs, and may be extended to other types of APIs. Moreover, the techniques described in this disclosure are not required to function in accordance with an API, and CPU 52 and GPU 80 may utilize any technique for communication.

Application 60 may include at least some of one or more instructions that cause graphic content to be displayed or one or more instructions that cause a non-graphics task (e.g., a general-purpose computing task) to be performed on CPU 52 or GPU 80. CPU 52 or GPU 80, in turn, may generate one or more layers for storage in system memory 56. For example, video layer 82 is generated to store and blend video content (from e.g., a video file). Where the aspect ratio of display panel 58 is different from the aspect ratio of video layer 82, background layer 84 may be generated by application 60 to provide a background layer to fill the parts of the display unfilled by the video. Background layer 84 may include a constant color (e.g., black, white, etc.) layer that when blended with video layer 82 creates letter or pillar boxes. Display processor 54 may retrieve image content such as video layer 82, background layer 84, and other layers 86 via bus 68 and perform image processing to generate the image content for display.

Display processor 54 may be configured to composite the various content on layers 82, 84, and 86 stored in system memory 56 for display on display panel 58. For instance, in addition to communication via bus 68, display processor 54 may be coupled to system memory 56 via one or more pipes (e.g., a hardware plane or a Mobile Display Sub-System (MDSS) pipe). Display processor 54 may be configured to retrieve the video content and layer information of layers 82, 84, and 86 from different applications executing on CPU 52 (e.g., a video player application such as application 60) or image content generated from GPU 80, stored in system memory 56.

As an example, CPU 52 may execute a plurality of applications that each generate image content (e.g., video content). For instance, CPU 52 may execute a video player application that uses a hardware or software video decoder (not shown) to generate video content that is stored in system memory 56. CPU 52 may also generate other layers such as background layer 84 used to create letter or pillar boxes around video content (in e.g., video layer 82) (or, may be, for instance, a constant color layer used in closed captioning) or other layers 86 which may include image wallpaper, launcher, status bar, navigation bar layers, and/or closed caption text. As another example, CPU 52 may execute a web browser that produces text content that is stored in system memory 56. Application 60 may generate video layer 82 and background layer 84. Other layers 86 may be generated by application 60, or OS 64. Layers 82, 84, and 86 may be considered as image layers having a backmost layer, a front most layer, and intermediate layers that may or may not overlay on top of one another. For instance, video layer 82 may overlay and occlude part of background layer 84. In some examples, other layers 82 may either be visible (overlaid) or occluded depending on user action or system defaults. In the video player application example, video layer 82 is an image layer having a higher order than background layer 84.

Display processor 54 retrieves the image content, and composites one single frame for display. For example, image (e.g., layer) content from one application may occlude image (e.g., layer) content from another application, and display processor 54 may ensure that the image content that is occluded does not interfere with the image content that is occluding. In general, compositing means that display processor 54 stitches image content from different applications into a single frame. Display processor 54 may perform additional functions such as filtering as well.

According to techniques of the present disclosure, controller 70 of display processor 54 may detect whether a layer of constant color information is being fed from application 60 to display processor 54. For example, if application 60 sends a black (or any single color) layer as a background (e.g., background layer), instead of fetching background layer 84 from system memory 56, display processor 54 may identify that the layer has only a constant color (by means of, e.g., a histogram), and display hardware 74 of display processor 54 may generate the pixels of the background layer and select a color for the background layer such that there is no memory fetch.

Display processor 54 may read in at least one frame of background layer 84 from system memory 56. Controller 70 of display processor 54 may determine whether the frame of background layer 84 is a constant color. A constant color refers to a single color of pixel data that is used throughout background layer 84. If background layer 84 is a constant color, controller 70 of display processor 54 may stop fetching background layer 84 from system memory 56. Instead, display processor 54 may generate background layer 84 for display on display panel 58. Controller 70 may monitor a data integrity check value to determine whether a layer (such as background layer 84) is unchanging. Such a data integrity check value may be a cyclic redundancy check (CRC) code, a checksum, a hash value, or other type of value generated to check the validity of raw data (e.g., image data). A CRC code is an error-detecting code that is often used to detect changes in data. CRCs are generated using cycle codes that produce a value that is a function of one or more characteristics of the raw data (e.g., image data). A hash function is a function that maps data of an arbitrary size to data of a fixed size. Hash functions are sometimes used in a hash table for accelerated lookup of duplicated records. Hash functions may also be used to generate data integrity check values for image data before and after processing. A checksum is data produced by an algorithm operating on data (e.g., image data) in order to detect errors during transmission, processing, or storage. In other examples, such a check value may be a multiple independent signature register (MISR), a linear feedback shift register (LFSR), and the like, though other techniques may be used.

Controller 70 may monitor feedback of the data integrity check, e.g., the CRC, for compositor 72 for each frame and determine whether the layer (e.g. background layer 84) is unchanging. Monitoring CRC feedback may include reviewing feedback to the display overlay engine (e.g., multimedia display processor (MDP) or display processor 54 (e.g., a Multiple-Input Signature Register (MISR) block)). A constant (unchanging) CRC across multiple (e.g., three) frames of the background layer indicate that the color is not changing. CRC information may be stored alongside layer data in system memory 56 and may be retrieved by display processor 54 to determine the layer is unchanging. This may indicate that a constant color is being fed from application 60 to compositor 72 of display processor 54. Controller 70 may (in conjunction or alternatively) monitor the histogram of the background layer. The histogram may be calculated by display processor 54. Display processor 54 may feed the calculated histogram value to compositor 72 (or a software display compositor). Based on the feedback, compositor 72 may drop the constant colored layer (background layer 84) from the composition, only using the generated fill layer. The histogram may act as a representation of the tonal (e.g., pixel value) distribution in the background layer. The image histogram may indicate how many pixels are repeated on a per color basis. For an entirely black layer, the histogram will show all the pixels with one color. For example, Table 1 illustrates a histogram with colors and the respective pixel count for each color.

TABLE 1

| Color | Count |
|---|---|
| 0x000000 (black) | 255 |
| 0xFFFFFF (white) | 0 |

The display processor 54 may detect a constant histogram color distribution that shows all pixels in the layer are of a constant/single color (e.g. black, white) value. Display processor 54 may determine the number of colors in the layer. The histogram may also be used to determine whether the layer is changing (or remains unchanged). An unchanging histogram may indicate that an unchanging constant color is being fed from application 60 to compositor 72 of display processor 54 (such as in the example of pillar or letter boxes around a video layer). The determination that a layer of constant color information is being fed from application 60 to display processor 54 may be performed every frame. In other examples, however, this determination may be performed at a greater or lesser frequency. In some examples, display processor 54 retrieves the background layer 84 from system memory 56 until a determination is made that the layer is unchanging across multiple frames.

In response to determining that that a constant color is being fed from application 60, display processor 54 (or a Mobile Display Sub-System (MDSS)) may generate the constant color. The constant color may be generated by hardware or software. The generation may avoid the fetching of the constant fill color from system memory 56. The constant fill color may be generated by using the constant fill color of a hardware plane (e.g., an MDSS pipe or solid fill hardware), which processes a layer (e.g., background layer 84). The hardware plane may be configured to self-fetch the constant color without fetching the entire background layer 84 from system memory 56. For example, only a single pixel of pixel color data may be used to generate the entire layer. In another example, dim layer hardware may be used to provide a constant fill color. This may free the source hardware planes so other layers can be assigned to the freed-up pipe (to e.g., fetch other layers). Dim layer hardware (also known as a hardware mixer) on display processor 54 includes hardware configured to brighten or darken layers, e.g. provide an overlay to a layer that makes the entire layer or portions of the layer darker or lighter in color.

Dim layer hardware may be configured to uniformly darken at least a portion of the plurality of layers. Compositor 72 (e.g., a display software compositor) may program display processor 54 with a constant color that is received as a feedback from histogram analysis. Display processor 54 may generate the solid fill pixel in hardware instead of fetching the pixel from memory.

In some examples, compositor 72 may determine background layer 84 is a constant color and may be dropped and generated completely at compositor 72. For example, after background layer 84 is retrieved a number of times (e.g., three), controller 70 of display processor 54 may remove the background layer 84 from system memory 56. Specifically, display hardware 74 may detect the color in the layer, e.g., based on the histogram. Display software compositor (e.g., compositor 72) may determine whether the layer has changed (e.g., is a constant color). Compositor 72 may drop background layer 84 from the composition cycle so that display hardware 74 will not fetch background layer 84 from system memory 56. Compositor 72 may program display hardware 74 with the constant color received as feedback, and display hardware 74 may generate the pixel(s) for the background layer.

In an example, display processor 54 may determine that background layer 84 is changing from frame to frame. Where background layer 84 is determined, by display processor 54, to be changing (or has recently changed), display processor 54 may stop generation of pixel data for background layer 84 and begin fetching the pixel data for background layer 84 from system memory 56.

Display processor 54 may fetch non-constant color layers from system memory 56 from e.g., video layer 82 and/or other layers 86 for compositing by compositor 72.

Compositor 72 may define positional information about each layer (where the layer will appear on the display, such as the layers edges and its Z order relative to other layers), and content (whether the information should be cropped or expanded to fill the bounds of the layer), or transformed (e.g., rotated or flipped). Compositor 72 may determine how each layer should be composited with other layers which includes information such as blending mode and a layer-wide alpha value for alpha compositing. Compositor 72 may also perform optimizations such as determining which portions of the layers have been updated since the previous frame.

Display hardware 74 (also known as a mixer) may blend the layers based on information determined by compositor 72. Display hardware 74 may blend or stitch layers fetched from system memory 56 and those generated by display processor 54 to form a single image frame. Controller 70 may receive information indicating the order of image content of layers 82, 84, and 86 and position information where layers 82, 84, and 86 are to be displayed from display driver 62.

Based on the ordering information and positions where layers 82, 84, and 86 are to be displayed, display hardware 74 (also known as a composition circuit) may blend or stitch the image layers. For example, if image content of video layer 82 occludes part of the background layer 84 (and/or other layers 86), then for blending, display hardware 74 may assign or receive information that the part of video layer 82 that occludes part of background layer 84 and/or other layers 86 has an opacity (or alpha) value of one. Accordingly, on the portion of display panel 58 where video layer 82 is to be displayed, display hardware 74 may cause the occluding part of video layer 82 to be displayed rather than the occluded part of background layer 84. Other techniques for blending and stitching are possible. Display processor 54 may store the blended frame in frame buffer 66.

Display processor 54 generates image signals that display processor 54 outputs to display panel 58 that cause display panel 58 to display the blended frame. Timing engine 76 may take the blended frame from a frame buffer 66 for output to display panel 58 for display. In this way, display panel 58 may be configured to display the graphical content (e.g., a video) generated by application 60 to a user.

In many cases, the image content from the applications is not static and is changing. Accordingly, display processor 54 periodically refreshes the image content displayed on display panel 58. For example, display processor 54 periodically retrieves image content from system memory 56, where the image content may have been updated by the execution of the applications (e.g. application 60), and outputs image signals to display panel 58 to display the updated image content via display interface 78.

Display panel 58 may be configured in accordance with a display interface. Such a display interface may include a display interface using the Mobile Industry Processor Interface, Display Serial Interface (MIPI DSI) standard. The MIPI DSI standard supports a video mode and command mode. In examples where display panel 58 is a video mode panel, display processor 54 may need to continuously refresh display panel 58 and display panel 58 does not need or include frame buffer 66. In examples where display panel 58 is a video mode panel, the entire image content is refreshed per refresh cycle (e.g., line-by-line). In examples where display panel 58 is a command mode panel, display panel 58 includes frame buffer 66 to which display processor 54 writes the image content of the frame. Display processor 54 then writes from frame buffer 66 to display panel 58. In such examples where display panel 58 is a command mode panel, display processor 54 may not need to refresh display panel 58 constantly. The rate at which display processor 54 refreshes the image content displayed on display panel 58 is referred to as the display refresh rate. Examples of the display refresh rate include 30 frames per second (fps), 60 fps, 120 fps, or potentially any number of frames per second. For examples where display panel 58 is a video mode panel, having an N fps means that display processor 54 is continuously updating display panel 58 via display interface 78 such that after every 1/N seconds, display panel 58 is refreshed with one entire frame. Continuously refreshing or updating display panel 58 may include refreshing or updating display panel 58 after each frame or, in other examples, after N frames, or M seconds, e.g., 2 frames, 15, frames, 0.1 seconds, etc.

Figure 7:
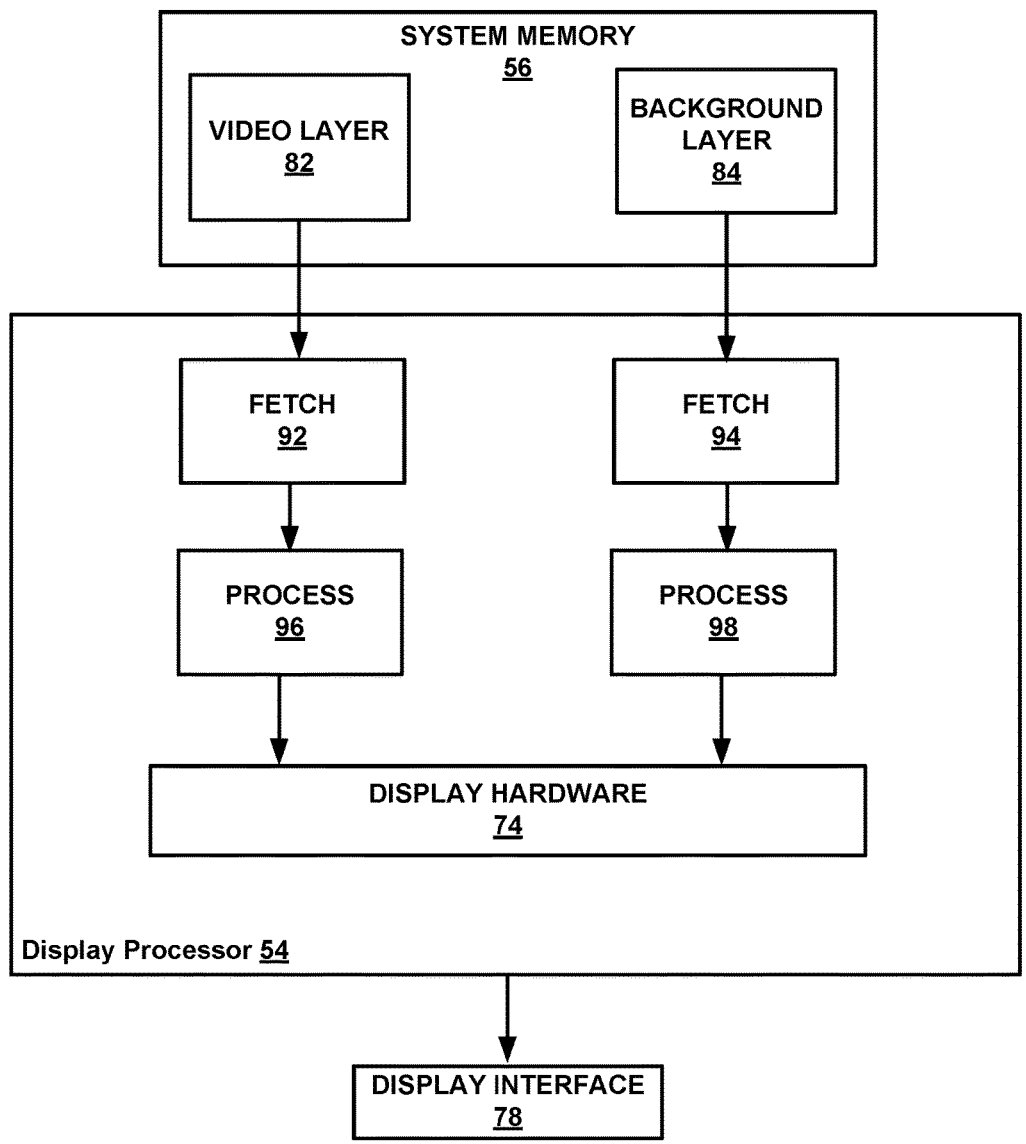
FIG. 7 is a process diagram illustrating an exemplary display compositor pipeline according to techniques of the present disclosure.

FIG. 7 is a process diagram illustrating an exemplary display compositor pipeline. The components in FIG. 7 having the same reference numeral as the components in FIG. 6 are the same or substantially the same. Therefore, those components are not described in further detail. In one example, system memory 56 includes video layer 82 containing video for display and background layer 84 with a constant color background layer to create letter or pillar boxes when blended with video layer 82. Display processor 54 may fetch video layer 82 (92) and fetch background layer 84 (94) from system memory 56. Display processor 54 may process the fetched video layer 82 (96) and process fetched background layer 84 (98). Display hardware 74 may blend the processed video layer 82 and background layer 84 creating a display frame. Display processor 54 may send the display frame to display panel 58 via display interface 78.

Figure 8:
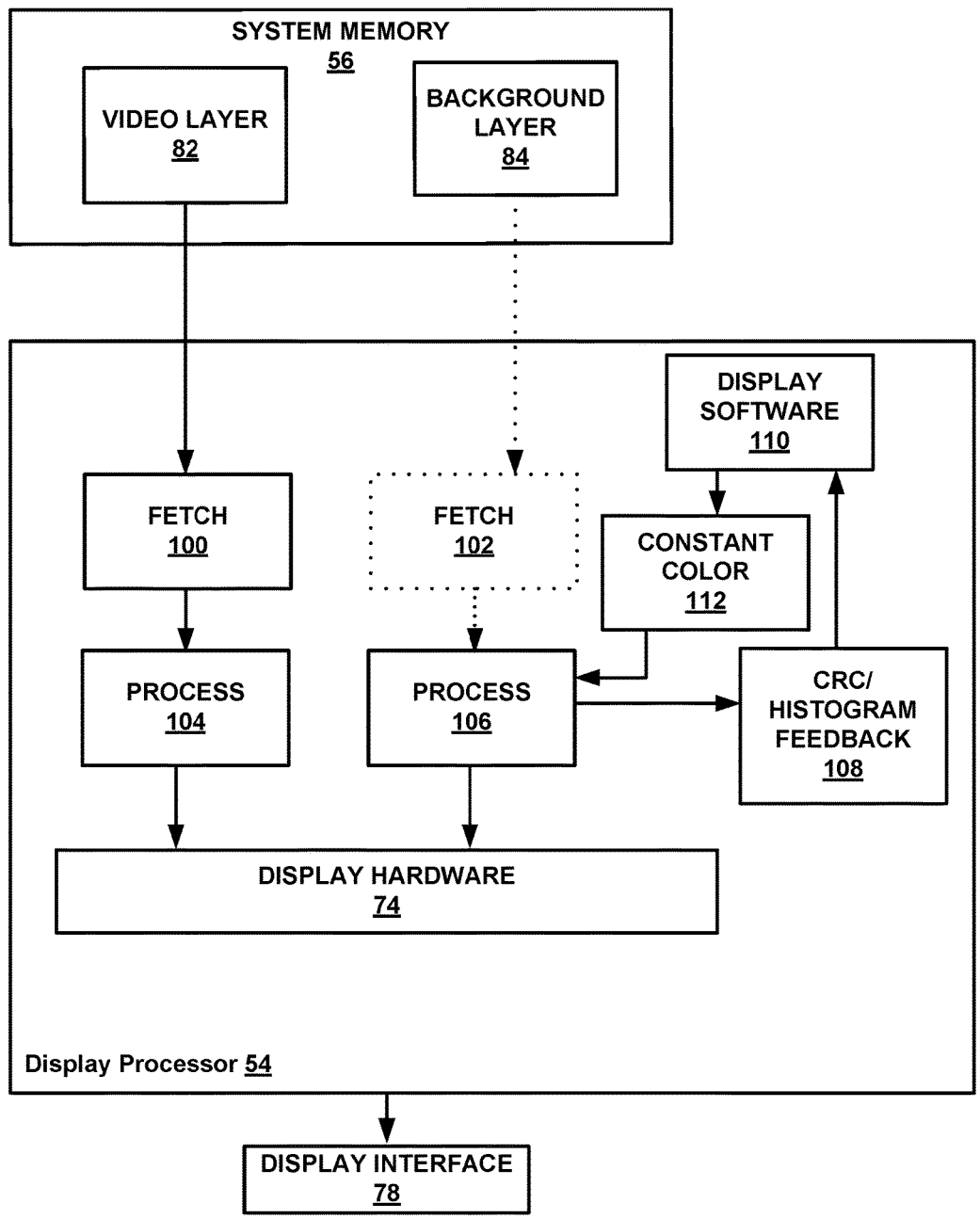
FIG. 8 is a process diagram illustrating an exemplary display compositor pipeline according to techniques of the present disclosure.

FIG. 8 is a process diagram illustrating an exemplary display compositor pipeline according to techniques of the present disclosure. The components in FIG. 8 having the same reference numeral as the components in FIG. 6 are the same or substantially the same. Therefore, those components are not described in further detail. In one example, system memory 56 includes video layer 82 containing video for display and background layer 84 with a constant color background layer to create letter or pillar boxes when blended with video layer 82. Display processor 54 may fetch video layer 82 from system memory 56 (92). Rather than fetch background layer 84 (e.g., entirely) from system memory 56 (102), display processor 54 may detect that a constant color is being fed from application 60 to display processor 54. Detecting whether background layer 84 is a constant color may include determining whether it only contains pixel data of a single color or only a constant perceptible color, via e.g., a histogram. This detection may occur after a number of frames of the background layer 84 have been processed and displayed, e.g., to confirm that the layer is a constant color and unchanging. Display processor 54 may determine whether a constant color is being fed from application 60 (via system memory 56) by examining a previously processed and displayed frame of background layer 84. In one example, display processor 54 may determine a CRC of the background layer 84 stored in a Multiple-Input Signature Register (MISR) block which may be stored alongside background layer 84 in system memory 56 and determine the CRC is the same as the CRC of a previous frame (or a previous threshold of frames) of background layer 84 (108) to determine that background layer 84 is not changing between frames. In another example, display processor 54 may determine that a histogram of background layer 84 shows a single (unchanging) color is in background layer 84 (108) to determine that background layer 84 is not changing between frames.

In response to determining that background layer 84 is a single (unchanging) color being fed from application 60 (via system memory 56), display software may generate the constant color (112). In one example, constant color 112 may be generated via a constant fill color of a hardware plane pipe (e.g., a mobile display sub-system (MDSS) pipe). The hardware plane pipe may output constant color pixels on the clock pulse. The hardware plane (e.g. MDSS) pipe that is used to fetch from system memory 56 may be used to fill the constant color without fetching the entire background layer 84 from system memory 56. In another example, dim layer hardware may generate the constant color 112. Display processor 54 may process the fetched video layer 82 (104) and obtain a generated background layer based on the constant color 112 (106). Display hardware 74 may blend the processed video layer 82 and the generated background layer and any other layers (e.g., other layers 86) creating a display frame. Display processor 54 may send the display frame to display panel 58 via display interface 78.

Figure 9:
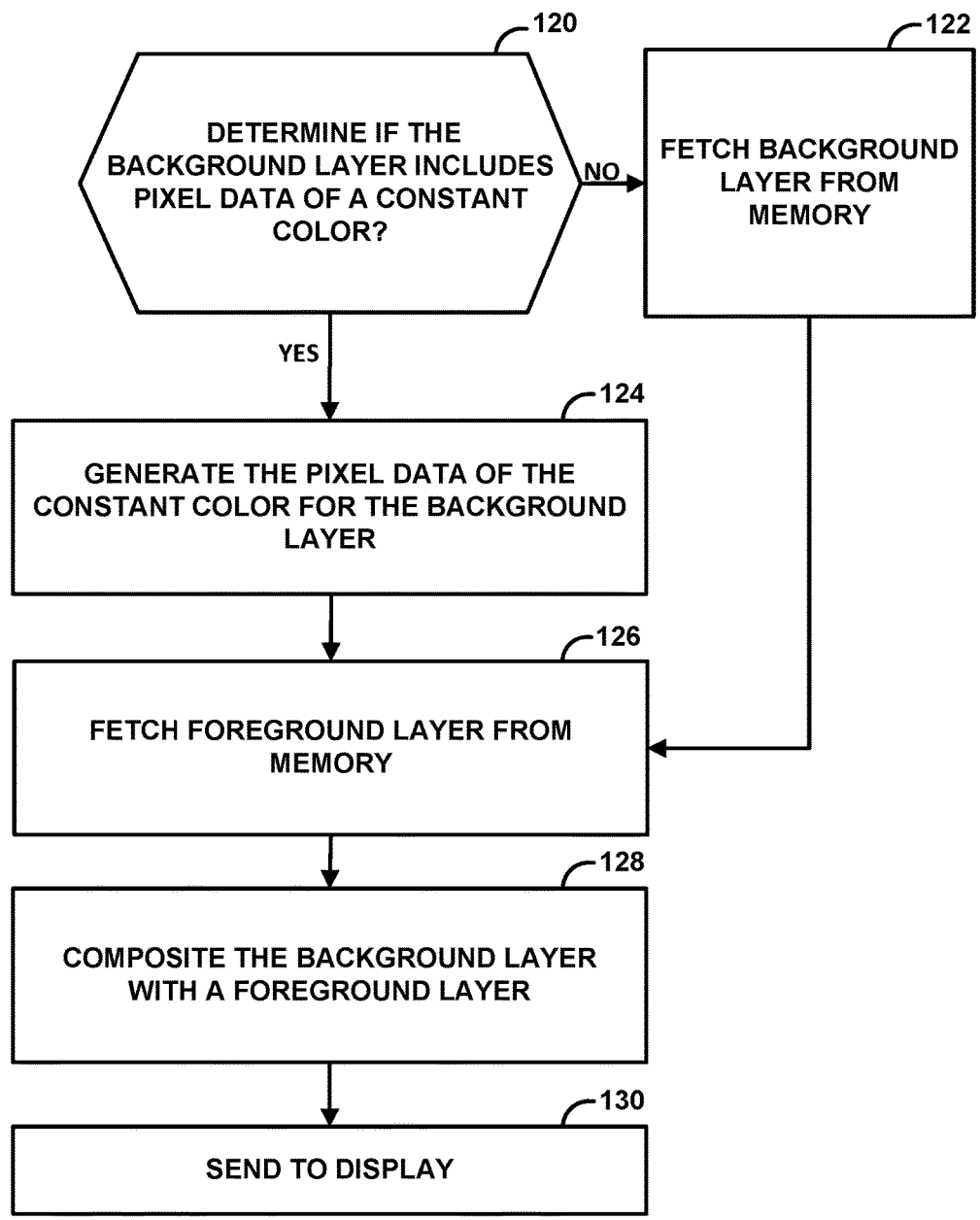
FIG. 9 is a flowchart illustrating an example method according to one or more example techniques described in this disclosure.

FIG. 9 is a flowchart illustrating an example method of operation according to one or more example techniques described in this disclosure. As illustrated in FIG. 9, display processor 54 (e.g., as shown in FIG. 1 or FIG. 6) may determine whether background layer 84 (e.g., as shown in FIG. 6, FIG. 7, or 8) includes pixel data of a constant color 112 (e.g., as shown in FIG. 8) (120). The background layer may be associated with an application associated a plurality of layers.

If the background layer does not include pixel data of a constant color (120, no branch), display processor 54 may fetch the background layer from system memory 56 (e.g., as shown in FIG. 1, FIG. 6, FIG. 7, or FIG. 8) (122). If the background layer includes pixel data of a constant color (120, yes branch), display processor 54 may generate the pixel data of the constant color for the background layer of the application (124). The generation of pixel data may allow display processor 54 to bypass (at least partially) fetching the background layer from system memory 56.

Display processor 54 may fetch a foreground layer (e.g., video layer 82 (e.g., as shown in FIG. 6, FIG. 7, or FIG. 8) from system memory 56 (126).

Display processor 54 may composite (in other words, mix and/or blend) the fetched or generated background layer with the fetched foreground layer (128). Display processor 54 may send the blended layer for display (130).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of displaying video data, the method comprising:
   detecting that a background layer comprising first pixel data of a constant color is being provided from a memory for display, wherein the background layer is of an application associated with a plurality of layers;
   generating second pixel data of the constant color for the background layer of the application without fetching all of the first pixel data of the constant color for the background layer from the memory in response to the detecting that the background layer comprises pixel data of the constant color;
   retrieving a foreground layer of the application associated with the plurality of layers from the memory; and
   compositing the retrieved foreground layer and the generated second pixel data of the constant color for the background layer for display.

2. The method of claim 1, wherein the foreground layer comprises a video layer, and the background layer, when composited with the foreground layer, produces a letter box or a pillar box around the video layer.

3. The method of claim 2, wherein detecting that the background layer is being provided for display is based on detecting that an aspect ratio of the foreground layer is different from the aspect ratio of a display panel.

4. The method of claim 1, wherein detecting that the background layer comprising first pixel data of the constant color is being provided for display comprises:
   monitoring a cyclic redundancy check (CRC) of a Multiple-Input Signature Register (MISR) block over a plurality of frames of the background layer; and
   determining that the CRC of the MISR block remains constant over the plurality of frames of the background layer.

5. The method of claim 1, wherein detecting that the background layer comprising first pixel data of the constant color is being provided for display comprises:
   monitoring a histogram color distribution of the background layer over a plurality of frames; and
   determining that the histogram color distribution remains constant over the plurality of frames of the background layer.

6. The method of claim 5, wherein monitoring the histogram color distribution of the background layer over the plurality of frames comprises determining a number of colors in the background layer.

7. The method of claim 1, further comprising, sending the second pixel data of the constant color for display.

8. The method of claim 1, further comprising removing the background layer in response to the detecting that the background layer comprises pixel data of the constant color.

9. The method of claim 1, wherein compositing the retrieved foreground layer and the generated second pixel data of the constant color for the background layer for display comprises compositing the retrieved foreground layer and the generated second pixel data of the constant color for the background layer into a first frame for display, and the method further comprises:
   when processing a subsequent frame for display, determining the background layer has changed; and
   based on the determination that the background layer has changed, stopping generation of the second pixel data for the background layer and fetching third pixel data for the background layer from the memory.

10. The method of claim 1, wherein generating the second pixel data of the constant color for the background layer comprises generating the constant color using a constant fill color.

11. The method of claim 1, wherein generating the constant color for the background layer comprises generating the constant color with a dim layer using a constant fill color, the dim layer configured to uniformly darken at least a portion of the plurality of layers.

12. An apparatus configured for displaying video data, the apparatus comprising:
    at least one internal memory; and
    one or more processors in communication with the at least one internal memory, the one or more processors configured to:
    detect that a background layer comprising first pixel data of a constant color is being provided from a memory for display, wherein the background layer is of an application associated with a plurality of layers;
    generate second pixel data of the constant color for the background layer of the application without fetching all of the first pixel data of the constant color for the background layer from the at least one internal memory in response to the detecting that the background layer comprises pixel data of the constant color;
    retrieve a foreground layer of the application associated with the plurality of layers from the at least one internal memory; and
    composite the retrieved foreground layer and the generated second pixel data of the constant color for the background layer for display.

13. The apparatus of claim 12, wherein the foreground layer comprises a video layer and the background layer, when composited with the foreground layer, produces a letter box or a pillar box around the video layer.

14. The apparatus of claim 13, wherein detecting that the background layer is being provided for display is based on detecting that an aspect ratio of the foreground layer is different from the aspect ratio of a display panel.

15. The apparatus of claim 12, wherein detecting that the background layer comprising first pixel data of the constant color is being provided for display comprises:
    monitoring a cyclic redundancy check (CRC) of a Multiple-Input Signature Register (MISR) block over a plurality of frames of the background layer; and
    determining that the CRC of the MISR block remains constant over the plurality of frames of the background layer.

16. The apparatus of claim 12, wherein detecting that the background layer comprising first pixel data of the constant color is being provided for display comprises:
    monitoring a histogram color distribution of the background layer over a plurality of frames; and
    determining that the histogram color distribution remains constant over the plurality of frames of the background layer.

17. The apparatus of claim 16, wherein monitoring the histogram color distribution of the background layer over the plurality of frames comprises determining a number of colors in the background layer.

18. The apparatus of claim 12, wherein the one or more processors are further configured to send the second pixel data of the constant color for display.

19. The apparatus of claim 12, wherein the one or more processors are further configured to remove the background layer in response to the detecting that the background layer comprises pixel data of the constant color.

20. The apparatus of claim 12, wherein compositing the retrieved foreground layer and the generated second pixel data of the constant color for the background layer for display comprises compositing the retrieved foreground layer and the generated second pixel data of the constant color for the background layer into a first frame for display, and wherein the one or more processors are further configured to:
when processing a subsequent frame for display, determine the background layer has changed; and
based on the determination that the background layer has changed, stop generation of the second pixel data for the background layer and fetching third pixel data for the background layer from the at least one internal.

21. The apparatus of claim 12, wherein generating the second pixel data of the constant color for the background layer comprises generating the constant color using a constant fill color.

22. The apparatus of claim 12, wherein generating the constant color for the background layer comprises generating the constant color with a dim layer using a constant fill color, the dim layer configured to uniformly darken at least a portion of the plurality of layers.

23. An apparatus configured for displaying video data, the apparatus comprising:
means for detecting that a background layer comprising first pixel data of a constant color is being provided from a memory for display, wherein the background layer is of an application associated with a plurality of layers;
means for generating second pixel data of the constant color for the background layer of the application without fetching all of the first pixel data of the constant color for the background layer from the memory in response to the detecting that the background layer comprises pixel data of the constant color;
means for retrieving a foreground layer of the application associated with the plurality of layers from the memory; and
means for compositing the retrieved foreground layer and the generated second pixel data of the constant color for the background layer for display.

24. The apparatus of claim 23, wherein the foreground layer comprises a video layer, and the background layer, when composited with the foreground layer, produces a letter box or a pillar box around the video layer.

25. The apparatus of claim 23, wherein the means for detecting that the background layer comprising first pixel data of the constant color is being provided for display comprises:
means for monitoring a cyclic redundancy check (CRC) of a Multiple-Input Signature Register (MISR) block over a plurality of frames of the background layer; and
means for determining that the CRC of the MISR block remains constant over the plurality of frames of the background layer.

26. The apparatus of claim 23, wherein the means for detecting that the background layer comprising first pixel data of the constant color is being provided for display comprises:
means for monitoring a histogram color distribution of the background layer over a plurality of frames; and
means for determining that the histogram color distribution remains constant over the plurality of frames of the background layer.

27. The apparatus of claim 23, further comprising, the means for sending the generated pixel data of the constant color for display.

28. A non-transitory computer-readable storage medium storing instructions that, when executed, causes one or more processors to:
detect that a background layer comprising first pixel data of a constant color is being provided from a memory for display, wherein the background layer is of an application associated with a plurality of layers;
generate second pixel data of the constant color for the background layer of the application without fetching all of the first pixel data of the constant color for the background layer from the memory in response to the detecting that the background layer comprises pixel data of the constant color;
retrieve a foreground layer of the application associated with the plurality of layers from the memory; and
composite the retrieved foreground layer and the generated second pixel data of the constant color for the background layer for display.

29. The non-transitory computer-readable storage medium of claim 28, wherein detecting that the background layer comprising first pixel data of the constant color is being provided for display comprises:
monitoring a cyclic redundancy check (CRC) of a Multiple-Input Signature Register (MISR) block over a plurality of frames of the background layer; and
determining that the CRC of the MISR block remains constant over the plurality of frames of the background layer.

30. The non-transitory computer-readable storage medium of claim 28, wherein detecting that the background layer comprising first pixel data of the constant color is being provided for display comprises:
monitoring a histogram color distribution of the background layer over a plurality of frames; and
determining that the histogram color distribution remains constant over the plurality of frames of the background layer.

* * * * *